US012739938B2

(12) United States Patent
Van Phan et al.

(10) Patent No.: US 12,739,938 B2

(45) Date of Patent: Sep. 15, 2026

(54) DRX-ENABLED MULTIPATH COMMUNICATIONS

(71) Applicant: Nokia Technologies Oy, Espoo (FI)

(72) Inventors: Vinh Van Phan, Oulu (FI); Ling Yu, Espoo (FI); Faranaz Sabouri-Sichani, Aalborg (DK)

(73) Assignee: NOKIA TECHNOLOGIES OY, Espoo (FI)

(*) Notice: Subject to any disclaimer, the term of this patent is extended or adjusted under 35 U.S.C. 154(b) by 391 days.

(21) Appl. No.: 18/491,214

(22) Filed: Oct. 20, 2023

(65) Prior Publication Data

US 2024/0155730 A1 May 9, 2024

Related U.S. Application Data

(60) Provisional application No. 63/382,324, filed on Nov. 4, 2022.

(51) Int. Cl.
*H04W 76/28* (2018.01)

(52) U.S. Cl.
CPC .................................. *H04W 76/28* (2018.02)

(58) Field of Classification Search
CPC .................................................... H04W 76/28
See application file for complete search history.

(56) References Cited

U.S. PATENT DOCUMENTS

2022/0095229 A1 3/2022 Ryu et al.
2022/0225468 A1 7/2022 Chae et al.
2023/0209643 A1* 6/2023 Wang .................... H04W 76/28 370/311

FOREIGN PATENT DOCUMENTS

WO 2021/163617 A1 8/2021
WO 2022/067339 A1 3/2022

OTHER PUBLICATIONS

Extended European Search Report received for corresponding European Patent Application No. 23205074.0, dated Mar. 14, 2024, 11 pages.

* cited by examiner

*Primary Examiner* — Michael Thier
*Assistant Examiner* — Tracy Lauren Raimondo
(74) *Attorney, Agent, or Firm* — Carter, DeLuca & Farrell LLP

(57) ABSTRACT

Embodiments of the present disclosure relate to devices, methods, apparatuses, and computer readable storage media for discontinuous reception (DRX)-enabled multipath (MP) communications. In a method, a first device receives a DRX configuration for a direct path between the first device and a second device and an indirect path between the first and second devices via a third device. The DRX configuration comprises at least one of a first DRX configuration or a second DRX configuration. The first DRX configuration is used for a first communication between the first and second devices on the direct path, and the second DRX configuration is used for a second communication between the first and third devices on the indirect path. Based on the received DRX configuration, the first device communicates with the second device on the direct path and with the third device on the indirect path.

13 Claims, 9 Drawing Sheets

Figure 5:
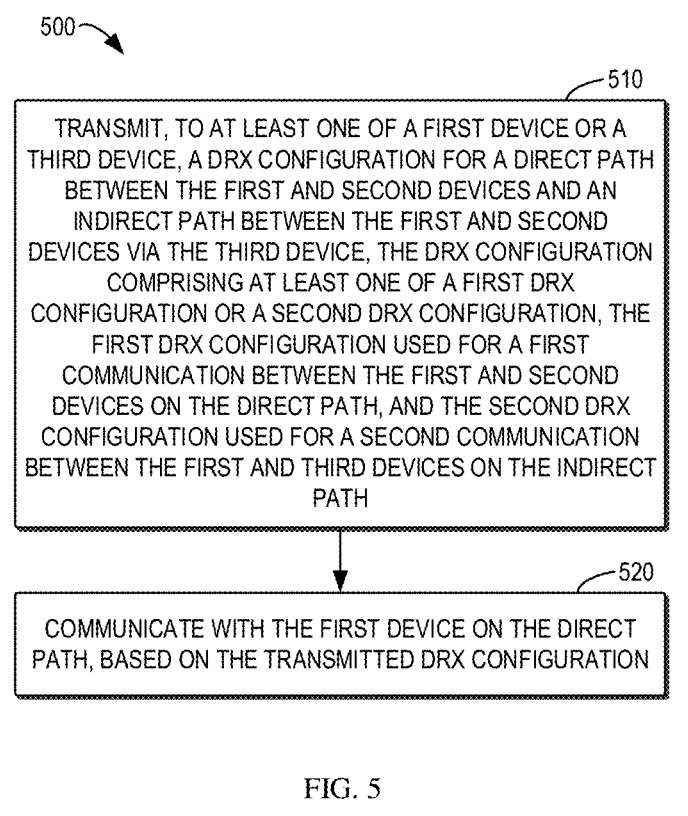

500

510

TRANSMIT, TO AT LEAST ONE OF A FIRST DEVICE OR A THIRD DEVICE, A DRX CONFIGURATION FOR A DIRECT PATH BETWEEN THE FIRST AND SECOND DEVICES AND AN INDIRECT PATH BETWEEN THE FIRST AND SECOND DEVICES VIA THE THIRD DEVICE, THE DRX CONFIGURATION COMPRISING AT LEAST ONE OF A FIRST DRX CONFIGURATION OR A SECOND DRX CONFIGURATION, THE FIRST DRX CONFIGURATION USED FOR A FIRST COMMUNICATION BETWEEN THE FIRST AND SECOND DEVICES ON THE DIRECT PATH, AND THE SECOND DRX CONFIGURATION USED FOR A SECOND COMMUNICATION BETWEEN THE FIRST AND THIRD DEVICES ON THE INDIRECT PATH

520

COMMUNICATE WITH THE FIRST DEVICE ON THE DIRECT PATH, BASED ON THE TRANSMITTED DRX CONFIGURATION

DRX-ENABLED MULTIPATH COMMUNICATIONS

CROSS-REFERENCE TO RELATED APPLICATION

This application claims priority from, and the benefit of, U.S. Provisional Application No. 63/382,324, filed on Nov. 4, 2022, the contents of which is hereby incorporated by reference in its entirety.

FIELDS

Various example embodiments of the present disclosure generally relate to the field of telecommunication and in particular, to devices, methods, apparatuses and computer readable storage medium for discontinuous reception (DRX)-enabled multipath (MP) communications.

BACKGROUND

In the third-generation partnership project (3GPP) Release 18 (Rel-18), multipath (MP) is provided in which remote user equipment (UE) is connected to its serving New Radio (NR) NodeB (gNB) with a direct path and an indirect path via a Layer 2 (L2) UE-to-Network (U2N) Relay UE. MP may be used for boosting a data rate or enhancing reliability for data transmissions of the Remote UE in a cell-edge scenario, for example, based on data split or duplication over the direct path and the indirect path. Packet Data Convergence Protocol (PDCP)-level data split or duplication in multi-connectivity (MC) may be used for MP. The direct and indirect paths may be provided by the same serving cell. Alternatively, the direct and indirect paths may be provided by different serving cells of the same serving gNB.

There may be a need for coordination between the gNB, the remote UE, and the relay UE to avoid conflict or misalignment in time for communications (transmissions and receptions) as well as a need for coordination between the gNB, the remote UE, and the relay UE to enable discontinuous reception (DRX) operation for power saving of the remote UE which is highly desirable.

SUMMARY

In a first aspect of the present disclosure, there is provided a first device. The first device comprises at least one processor; and at least one memory storing instructions that, when executed by the at least one processor, cause the first device at least to perform: receiving a discontinuous reception, DRX, configuration for a direct path between the first device and a second device and an indirect path between the first and second devices via a third device, the DRX configuration comprising at least one of a first DRX configuration or a second DRX configuration, the first DRX configuration used for a first communication between the first and second devices on the direct path, and the second DRX configuration used for a second communication between the first and third devices on the indirect path; and communicating with the second device on the direct path and with the third device on the indirect path, based on the received DRX configuration.

In a second aspect of the present disclosure, there is provided a second device. The second device comprises at least one processor; and at least one memory storing instructions that, when executed by the at least one processor, cause the second device at least to perform: transmitting, to at least one of a first device or a third device, a discontinuous reception, DRX, configuration for a direct path between the first and second devices and an indirect path between the first and second devices via the third device, the DRX configuration comprising at least one of a first DRX configuration or a second DRX configuration, the first DRX configuration used for a first communication between the first and second devices on the direct path, and the second DRX configuration used for a second communication between the first and third devices on the indirect path; and communicating with the first device on the direct path based on the transmitted DRX configuration.

In a third aspect of the present disclosure, there is provided a third device. The third device comprises at least one processor; and at least one memory storing instructions that, when executed by the at least one processor, cause the third device at least to perform: receiving a discontinuous reception, DRX, configuration for a direct path between a first device and a second device and an indirect path between the first and second devices via the third device, the DRX configuration comprising at least one of a first DRX configuration or a second DRX configuration, the first DRX configuration used for a first communication between the first and second devices on the direct path, and the second DRX configuration used for a second communication between the first and third devices on the indirect path; and communicating with the first device on the indirect path based on the received DRX configuration.

In a fourth aspect of the present disclosure, there is provided a method. The method comprises: at a first device, receiving a discontinuous reception, DRX, configuration for a direct path between the first device and a second device and an indirect path between the first and second devices via a third device, the DRX configuration comprising at least one of a first DRX configuration or a second DRX configuration, the first DRX configuration used for a first communication between the first and second devices on the direct path, and the second DRX configuration used for a second communication between the first and third devices on the indirect path; and communicating with the second device on the direct path and with the third device on the indirect path, based on the received DRX configuration.

In a fifth aspect of the present disclosure, there is provided a method. The method comprises: at a second device, transmitting, to at least one of a first device or a third device, a discontinuous reception, DRX, configuration for a direct path between the first and second devices and an indirect path between the first and second devices via the third device, the DRX configuration comprising at least one of a first DRX configuration or a second DRX configuration, the first DRX configuration used for a first communication between the first and second devices on the direct path, and the second DRX configuration used for a second communication between the first and third devices on the indirect path; and communicating with the first device on the direct path based on the transmitted DRX configuration.

In a sixth aspect of the present disclosure, there is provided a method. The method comprises: at a third device, receiving a discontinuous reception, DRX, configuration for a direct path between a first device and a second device and an indirect path between the first and second devices via the third device, the DRX configuration comprising at least one of a first DRX configuration or a second DRX configuration, the first DRX configuration used for a first communication between the first and second devices on the direct path, and the second DRX configuration used for a second communication between the first and third devices on the indirect path; and communicating with the first device on the indirect path based on the received DRX configuration.

In a seventh aspect of the present disclosure, there is provided a first apparatus. The first apparatus comprises means for receiving a discontinuous reception, DRX, configuration for a direct path between the first device and a second device and an indirect path between the first and second devices via a third device, the DRX configuration comprising at least one of a first DRX configuration or a second DRX configuration, the first DRX configuration used for a first communication between the first and second devices on the direct path, and the second DRX configuration used for a second communication between the first and third devices on the indirect path; and means for communicating with the second device on the direct path and with the third device on the indirect path, based on the received DRX configuration.

In an eighth aspect of the present disclosure, there is provided a second apparatus. The second apparatus comprises means for transmitting, to at least one of a first device or a third device, a discontinuous reception, DRX, configuration for a direct path between the first and second devices and an indirect path between the first and second devices via the third device, the DRX configuration comprising at least one of a first DRX configuration or a second DRX configuration, the first DRX configuration used for a first communication between the first and second devices on the direct path, and the second DRX configuration used for a second communication between the first and third devices on the indirect path; and means for communicating with the first device on the direct path based on the transmitted DRX configuration.

In a ninth aspect of the present disclosure, there is provided a third apparatus. The third apparatus comprises means for receiving a discontinuous reception, DRX, configuration for a direct path between a first device and a second device and an indirect path between the first and second devices via the third device, the DRX configuration comprising at least one of a first DRX configuration or a second DRX configuration, the first DRX configuration used for a first communication between the first and second devices on the direct path, and the second DRX configuration used for a second communication between the first and third devices on the indirect path; and means for communicating with the first device on the indirect path based on the received DRX configuration.

In a tenth aspect of the present disclosure, there is provided a computer readable medium. The computer readable medium comprises instructions stored thereon for causing an apparatus to perform at least the method according to the fourth, fifth or sixth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 5 illustrates a flowchart of an example method implemented at a second device in accordance with some example embodiments of the present disclosure;

FIG. 6 illustrates a flowchart of an example method implemented at a third device in accordance with some example embodiments of the present disclosure;

Throughout the drawings, the same or similar reference numerals represent the same or similar element.

DETAILED DESCRIPTION

Figure 1:
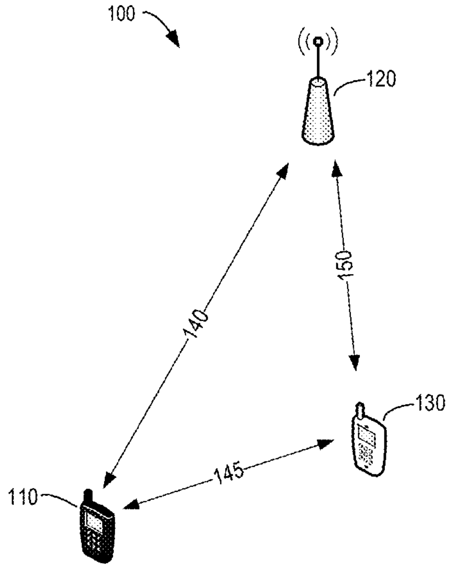
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

As used herein, the term "relay device" refers to a device which can provide an amplify-and-forward or decode-and-forward function between a terminal device and a network device, especially, the terminal device is moving out of coverage of the network device. In some embodiments, the relay device may receive control information from the network device to enhance the amplify-and-forward or decode-and-forward function. The relay device may be implemented by a terminal device such as a relay UE. The relay device may also be implemented by a network device.

As used herein, the term "sidelink" (SL) refers to a communication link between terminal devices. Resources via sidelink may be configured by the network.

As used herein, the term "discontinuous reception" (DRX) refers to a reception mode in which a device wakes up periodically to listen for the power-saving purpose.

In MP, a remote UE is connected to its serving gNB with a direct path and an indirect path via a relay UE. There may be a need, referred to as a first issue, for coordination between the gNB, the remote UE, and the relay UE to avoid conflict or misalignment in time for Uu transmissions between the gNB and the remote UE and between the gNB and the relay UE and for SL transmissions between the remote UE and the relay UE. This may include a half-duplex issue. For example, the remote UE or the relay UE may not be able to transmit or receive to/from the gNB over a Uu interface when transmitting or receiving to/from one another over a sidelink (SL) interface all in the same carrier. As another example, the remote UE may have only one radio frequency (RF) chain which may be used for either listening or transmitting.

There may be another need, referred to as a second issue, for coordination between the gNB, the remote UE, and the relay UE for transmissions over Uu interfaces, referred to as Uu transmissions, and transmissions over SL interfaces, referred to as SL transmissions, to enable discontinuous reception (DRX) operation for power saving of the remote UE which is highly desirable. SL DRX is provided for SL enhancements in Release 17 (Rel-17). For example, a SL DRX configuration for a receiving (Rx) UE in a SL unicast between a transmitting (Tx) UE and the Rx UE is determined and provided by the Tx UE or the serving gNB of the Tx UE. The SL DRX does not address or consider any particular aspect for the remote UE in SL based U2N relay. Some enhancements on SL DRX for the remote UE in SL based U2N relay may be expected.

The first and second issues may be interrelated. For example, when the remote UE is in an OFF duration over one of the SL or Uu interface, the remote UE may be able to communicate over the other one of the SL or Uu interface without conflict or misalignment. This implies that a DRX configuration from the gNB to the remote UE may be utilized for coordinating Uu and SL transmissions for the remote UE between the gNB, the remote UE and the relay UE in MP to resolve the first issue. As such, a DRX configuration procedure from the gNB to the remote UE aimed to address the second issue may be utilized to address the first issue alone or together with the second issue.

Example embodiments of the present disclosure propose a scheme for facilitating a DRX configuration for a device (such as the remote UE) in MP in order to resolve the first issue (for example, coordination for Uu and SL transmissions of the remote UE) or both the first issue and the second issue (for example, enabling DRX for power saving of the remote UE). The scheme utilizes flexible time-division mechanisms for DRX operations on a direct path and an indirect path of the device, to control data transmissions over the direct and indirect paths in MP.

In this way, Uu and SL DRX mechanisms may be utilized to enable and facilitate a practical control of MP transmissions with and without DRX operations for power saving for the remote UE.

FIG. 1 illustrates an example communication environment 100 in which example embodiments of the present disclosure can be implemented. In the communication environment 100, three communication devices, including a first device 110, a second device 120 and a third device 130, may communicate with each other. The first device 110 may communicate with the second device 120 on a direct path 140 and on an indirect path via the third device 130, including two links 145 and 150.

In the following, for the purpose of illustration, some example embodiments are described with the first, second and third devices 110, 120 and 130 operating as a remote UE, a gNB and a relay UE. The remote UE or the relay UE may communicate with the gNB over Uu interfaces, and the remote UE and the relay UE may communicate with each other over SL. In SL communications, the remote UE may act as a Rx UE, and the relay UE may act as a Tx UE; or vice versa. It is to be understood that, in some example embodiments, the first, second or third device 110, 120 or 130 may operate as either a terminal device or a network device.

Communications in the environment 100 may utilize any suitable wireless communication technology, including, but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In various example embodiments, at least one of a first DRX configuration for the direct path or a second DRX configuration for the indirect path is determined by the second device 120 for controlling multipath transmissions of the first device 110 or for both controlling multipath transmissions and power-saving of the first device 110. Based on the first and/or second DRX configuration, the first device 120 may switch between the direct and indirect paths for data communications over MP.

Figure 2:
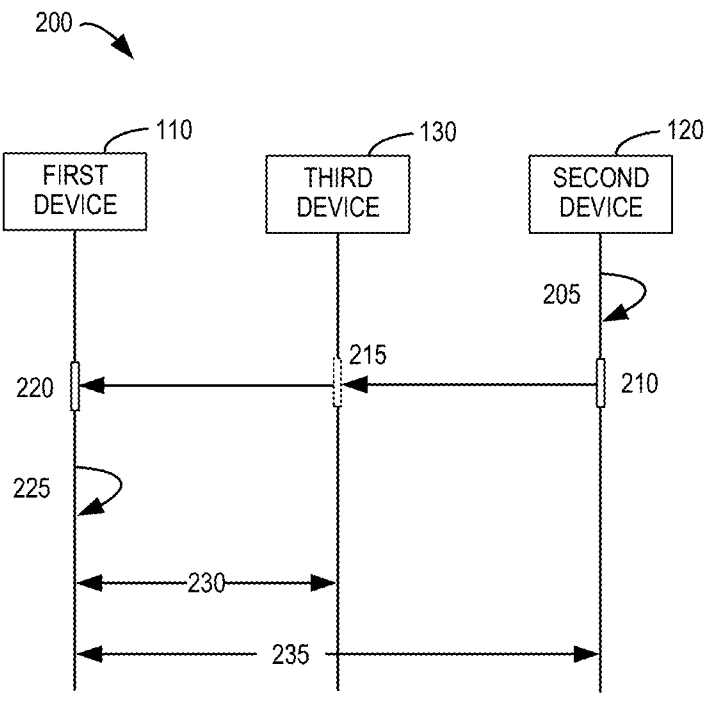
FIG. 2 illustrates an example signaling diagram of an example communication process according to some example embodiments of the present disclosure.

FIG. 2 shows an example signaling diagram of an example communication process 200 between the first, second and third devices 110, 120 and 130 according to some example embodiments of the present disclosure.

In the process 200, the second device 120 may determine (205) at least one of a first DRX configuration for a first communication between the first and second devices 110 and 120 on the direct path 140, or a second DRX configuration for a second communication between the first and third devices 110 and 130 on the indirect path (for example, in the link 145). In some example embodiments, the second device 120 may determine either the first or second DRX configuration to control MP transmissions for the first device in a time-division fashion between the direct path and the indirect path (for example, to address the first issue). In some example embodiments, the second device 120 may determine both the first and second DRX configurations both for controlling the MP transmission and for power saving (for example, the second issue).

The second device 120 may transmit (210) the determined first and/or second DRX configuration towards the first device 110. In some example embodiments, the first and/or second DRX configuration may be forwarded (215) by the third device 130 to the first device 110.

Accordingly, the first device 110 may receive (220) the at least one of the first or second DRX configuration. Based on the first and/or second DRX configuration, the first device 110 may determine (225) a time division for switching between the direct path and the indirect path for communications over MP. According to the determined time division, the first device 110 and the third device 130 may communicate (230) on the indirect path, and the first device 110 and the second device 120 may communicate (235) on the direct path.

In this way, the DRX operations may be utilized for coordination between the first, second and third devices 110, 120 and 130 to avoid conflict or misalignment in time for transmissions on the direct and indirect paths in MP. Therefore, the communication efficiency may be improved in MP transmissions.

Figure 3:
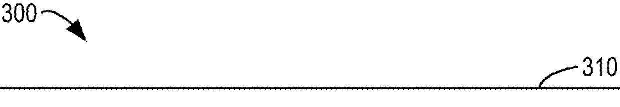
FIG. 3 illustrates a flowchart of an example method implemented at a first device in accordance with some example embodiments of the present disclosure.

FIG. 3 shows a flowchart of an example method 300 implemented at a first device in accordance with some example embodiments of the present disclosure. For the purpose of discussion, the method 300 will be described from the perspective of the first device 110 in FIG. 1.

At block 310, the first device 110 receives a DRX configuration for a direct path between the first and second devices 110 and 120 and an indirect path between the first and second devices 110 and 120 via the third device 130. The DRX configuration comprises at least one of a first DRX configuration or a second DRX configuration. The first DRX configuration is used for the first communication between the first and second devices 110 and 120 on the direct path 140. The second DRX configuration is used for the second communication between the first and third devices 110 and 130 on the indirect path (for example, in the link 145).

The DRX configuration may be received from either the second device 120 or the third device 130. In 3GPP NR standards, a DRX configuration over an Uu interface, also referred to as a Uu DRX configuration, may be provided from the serving gNB to the UE in radio resource control connected (RRC_CONNECTED) state directly, and a DRX configuration over a SL interface, also referred to as a SL DRX configuration, may be determined by the gNB but provided from the gNB to the Tx UE and then from Tx UE to the Rx UE over SL. To minimize standardization impacts, in the case that the first, second and third devices 110, 120 and 130 operate as the remote UE, the gNB and the relay UE, if the DRX configuration comprises only the first DRX configuration (for example, the Uu DRX configuration), the first device 110 may receive the DRX configuration from the second device 120. If the DRX configuration comprises only the second DRX configuration (for example, the SL DRX configuration), the first device 110 may receive the DRX configuration from the third device 130 which receives the DRX configuration from the second device 120 and then forward it to the first device 110.

It is also possible that the first device 110 may receive the first DRX configuration (such as the Uu DRX configuration) from the third device 130, and/or the first device 110 may receive the second DRX configuration (such as the SL DRX configuration) from the second device 120. The scope of the present disclosure will not be limited in this regard.

In some example embodiments, the DRX configuration may be received from both the second device 120 and the third device 130. For example, in the case that the DRX configuration comprises both the first and second DRX configuration, the first DRX configuration and the second DRX configuration may be sent to the first device 110 separately. The first DRX configuration may be sent over the direct path, and the second DRX configuration may be sent over the indirect path. Alternatively, both the first and second DRX configurations may be received over one path, for example, over either the direct or indirect path. The scope of the present disclosure will not be limited in this regard.

The third device 130 may need to be aware of the DRX configuration of the first device 110 for coordinating data transmissions for the first device 110 in MP. In some embodiments, if the DRX configuration is received by the first device 110 from the second device 130 directly, the first device 110 may indicate the received DRX configuration to the third device 130. Some example embodiments related to the third device 130 will be discussed in the following paragraphs with reference to FIG. 6.

In some example embodiments, the first device 110 may receive an indication whether the at least one of the first or second DRX configuration is used for controlling MP transmissions (for example, the first issue) of the first device 110 or for both controlling MP transmissions and power-saving (for example, the second issue) of the first device 110. The indication may be implicit or explicit and indicative of whether the DRX configuration is meant for addressing the first issue or both the first issue and the second issue. In this way, a normal DRX configuration procedure may be reused for controlling MP transmissions.

In some example embodiments, the DRX configuration may comprise either the first DRX configuration (such as the Uu DRX configuration) or the second configuration (such as the SL DRX configuration) for addressing the first issue. In some example embodiments, the second configuration such as the SL DRX configuration may be used to implicitly indicate that the DRX configuration is for addressing the first issue, thereby avoiding a need of an explicit indication that the DRX configuration is for addressing the first issue. As such, the system overhead may be reduced, and communication resources may be saved.

In some example embodiments, the DRX configuration may comprise both the first DRX configuration (such as the Uu DRX configuration) and the second configuration (such as the SL DRX configuration) for addressing both the first issue and the second issue. In these example embodiments, if the first and second DRX configurations are sent separately over the direct and indirect paths, an explicit indication may be needed which is indicative of that the first and second DRX configurations are for addressing both the first issue and the second issue. Thus, the first device 110 may be aware of the purpose of the first and second DRX configurations and perform actions accordingly.

Some example embodiments of how to determine the DRX configuration will be discussed in the paragraphs with reference to FIG. 5. In some example embodiments, the determining may be based on whether a DRX configuration request for power saving is sent from the first device 110. If the first device 110 transmits a request for at least one of the first or the second DRX configuration to the second device 120 directly or via the third device 130, which means that the first device 110 requests for power saving, then both the first and second DRX configurations may be provided to the first device 110. The first device 110 may receive either the first or second DRX configuration without such requesting.

At block 320, based on the received DRX configuration, the first device 110 communicates with the second device 120 on the direct path and with the third device 130 on the indirect path. In some example embodiments, the first device 110 may determine, based on the received DRX configuration, a time division for switching between the direct path and the indirect path, and then communicate on the direct and indirect paths based on the determined time division.

In some example embodiments, in the case that the DRX configuration comprises only the first DRX configuration indicating a first ON duration and a first OFF duration in a first DRX cycle for the first communication, the first device 110 may communicate with the second device 120 on the direct path for the first ON duration. Alternatively, or in addition, the first device 110 may communicate with the third device 130 on the indirect path for the first OFF duration.

In some example embodiments, the first ON duration may be extended over at least a part of the first OFF duration due to more data to be (re)transmitted. In these embodiments, the first device 110 may transmit, to the third device 130, a first notification that the first ON duration is extended over at least the part of the first OFF duration. The first notification may implicitly or explicitly indicate an extension time of the ON duration on the direct path. The first device 110 may receive an indication of the extension during the first ON duration and thereby determine that the first ON duration is extended. For an example, in case the first device 110 has data to (re)transmit or receive near to or at the end of the first ON duration, an extension of the first ON duration, by a configured inactivity timer or retransmission timer being restarted at the first device upon the data (re)transmission or reception, is expected. The received indication of the extension therefore can be considered as or caused by the restart of the respective timer near to or at the end of the first ON duration. Accordingly, based on the first notification, the third device 130 may delay the second communication with the first device 110 over the indirect path for the extension time to coordinate the MP transmissions and avoid the conflicts. It may be also possible that the second device 120, as a transmitter of data on the direct path, sends the first notification to the third device 130. Some example embodiments in this regard will be detailed in the following paragraph with reference to FIGS. 5 and 6. In this way, ON-OFF durations with extendable ON duration per DRX cycle may be reused to provide flexibility as well as to minimize the standardize impacts.

Figure 4A:
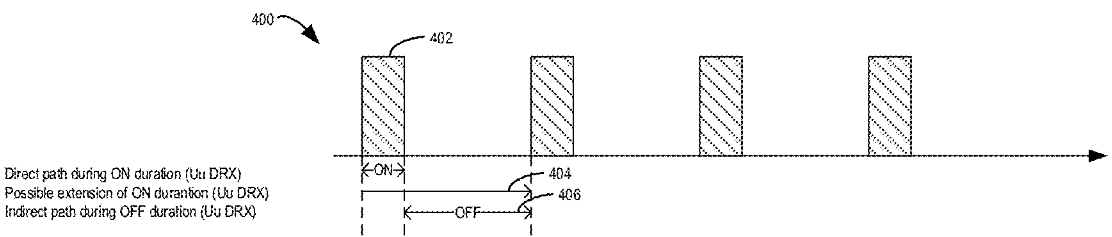
FIGS. 4A to 4E illustrate example communication processes with the received DRX configuration comprising either or both of a first DRX configuration and a second DRX configuration according to some example embodiments of the present disclosure.

FIG. 4A shows an example communication process 400 with the received DRX configuration comprising the first DRX configuration according to some example embodiments of the present disclosure.

In this example, the DRX configuration comprises only the first DRX configuration (for example, the Uu DRX configuration). The time division may be that the first device 110 (for example, the remote UE) may communicate with the second device 120 (for example, the gNB) to prioritize the first communication with the second device 120 on the direct path for a first ON duration 402 in a first DRX cycle 404. Moreover, the first device 110 may communicate with the third device 130 (for example, the relay UE) to prioritize the second communication with the third device 130 on the indirect path for a first OFF duration 406. The first ON duration 402 is extendable in the first DRX cycle 404 for the first communication.

In some example embodiments, in the case that the DRX configuration comprises only the second DRX configuration indicating a second ON duration and a second OFF duration in a second DRX cycle for the second communication, the first device 110 may communicate with the third device 130 on the indirect path for the second ON duration, or communicate with the second device 120 on the direct path for the second OFF duration.

In some example embodiments, if the second ON duration is extended over at least a part of the second OFF duration, the first device 110 may transmit, to the second device 120, a second notification that the second ON duration is extended over at least the part of the second OFF duration. Accordingly, the second device 120 may delay the first communication with the first device 110, which will be detailed in the following paragraph with reference to FIG. 5.

Figure 4B:
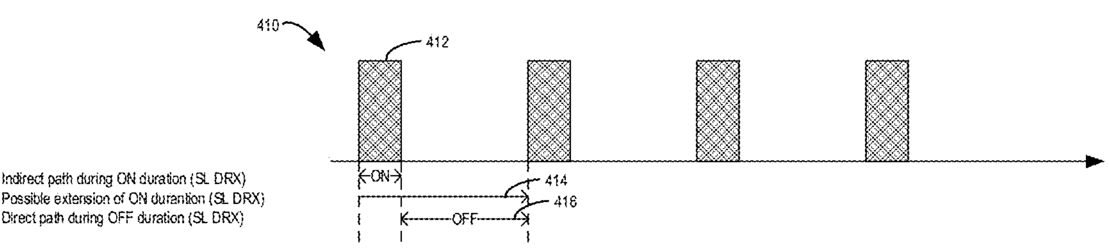

FIG. 4B shows an example communication process 410 with the received DRX configuration comprising the second DRX configuration according to some example embodiments of the present disclosure.

In this example, the DRX configuration comprises only the second DRX configuration (for example, the SL DRX configuration). The time division may be that the first device 110 (for example, the remote UE) may communicate with the third device 130 (for example, the relay UE) on the indirect path for a second ON duration 412 in a second DRX cycle 414. The first device 110 may also communicate with the second device 120 (for example, the gNB) on the indirect path for a second OFF duration 416.

In some example embodiments, in the case that the DRX configuration comprises both the first and second DRX configurations, the first DRX configuration may indicate a first ON duration and a first OFF duration in a first DRX cycle for the first communication, and the second DRX configuration may indicate a second ON duration and a second OFF duration in a second DRX cycle for the second communication. In this case, the first device 110 may communicate with the second device 120 on the indirect path for the first ON duration, and communicate with the third device 130 on the direct path for the second ON duration.

In some example embodiments, the first device 110 may be in a DRX OFF state for an overlapping OFF duration of the first and second OFF durations. For example, the first device 110 may enter the DRX state on both the direct path and the indirect path indirect path for power saving. In this way, the DRX configuration may be used both for controlling MP transmissions and for power-saving.

In some example embodiments, the first ON duration may be extended over at least a part of the first OFF duration except the second ON duration or until the start thereof depending on the amount of data to be transmitted over the direct path. Alternatively, or in addition, the second ON duration may be extended over at least a part of the second OFF duration except the first ON duration or until the start thereof depending on the amount of data to be transmitted over the indirect path.

Upon an extension of the ON durations 402 and 412 according to the first DRX configuration and operation as shown in FIG. 4A and according to the second DRX configuration and operation as shown in FIG. 4B, the first device 110 may send a notification to either the third device 130 or the second device 120, respectively. Such a notification may also be sent from the second device 120 to the third device 130 (in the example as shown in FIG. 4A), or from the third device 130 to the second device 120 (in the example as shown in FIG. 4B).

For example, in case the DRX configuration for the first device 110 is for addressing the first issue, for example, controlling MP transmissions between the direct path and the indirect path, an ON duration of the first device 110 over the direct path towards the second device 120 or over the indirect path towards the third device 130 may be extended depending on the ongoing traffic or activity of the first device 110. In this case, the first device 110 may notify the third device 130 (for example, over SL) or the second device 120 (for example, over Uu) of the extension of the ON duration over the direct path or over the indirect path, respectively. Alternatively, or in addition, the second device 120 may notify the third device 130 or the third device 130 may notify the second device 120 of the extension of the ON duration for the first device 110 over the direct path or the indirect path, respectively.

Example communication processes with the received DRX configuration comprising both the first and second DRX configurations will be discussed below with reference to FIGS. 4C, 4D and 4E.

Figure 4C:
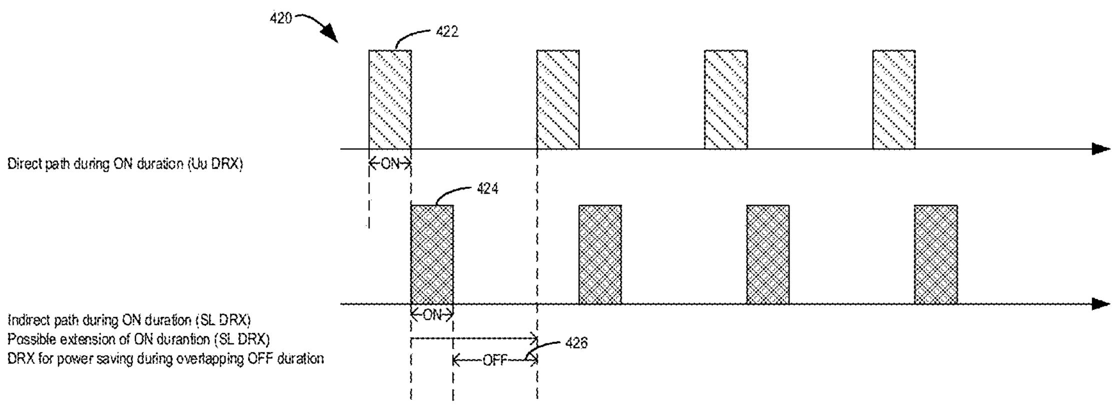

Reference is first made to FIG. 4C. In a process 420 as shown in FIG. 4C, a first ON duration 422 is immediately prior to a second ON duration 424. The second device 120 (for example, the gNB) may determine the first DRX configuration (for example, the Uu DRX configuration) and the second DRX configuration (for example, the SL DRX configuration) according to a predefined alignment for the remote UE. The first ON duration 422 for the first device 110 (for example, the remote UE) to be active towards the second device 120 for the direct path is equal to the second ON duration 424 according to the second DRX configuration. The first device 110 may communicate over the respective paths during the respective ON durations. In this example, the second ON duration 424 may be extended over an overlapping OFF duration 426 from both the first and second DRX configurations.

Figure 4D:
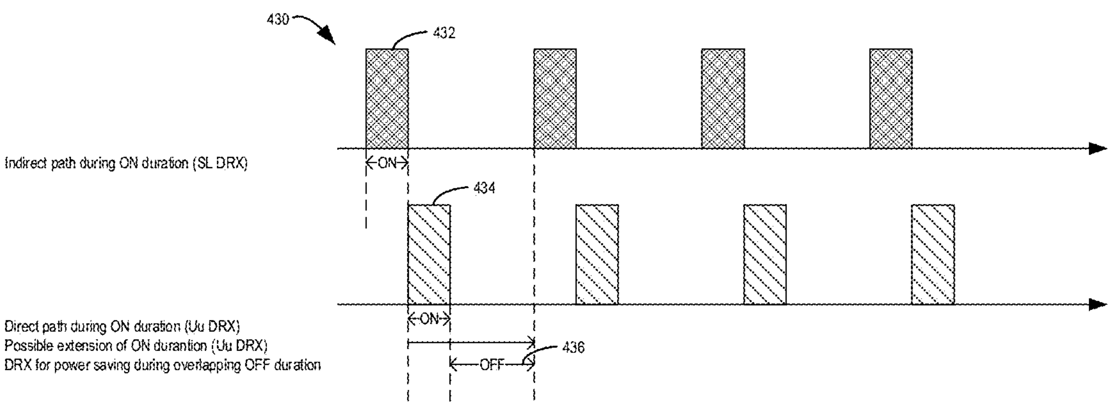

In a process 430 as shown in FIG. 4D, a second ON duration 432 is immediately prior to a first ON duration 434. The second ON duration 432 for the first device 110 (for example, the remote UE) to be active towards the third device 130 for the indirect path is equal to the first ON duration 434 according to the first DRX configuration. The first ON duration 434 may be extended over an overlapping OFF duration 436 from both the first and second DRX configurations.

Figure 4E:
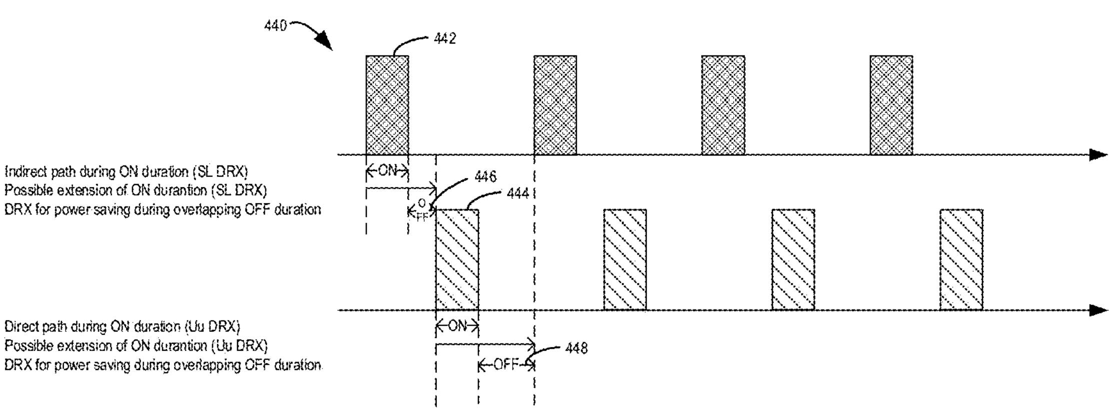

In a process 440 as shown in FIG. 4E, a second ON duration 442 is before a first ON duration 444. The second ON duration 442 may be extended over an overlapping OFF duration 446 except the first ON duration 444 or until the start thereof. The first ON duration 444 may be extended over an overlapping OFF duration 448 except the second ON duration 444 or until the start thereof. In addition, the first device 110 may be in a DRX OFF state for power saving towards both the second device 120 and the third device 130 over overlapping OFF durations 446 and 448 from the first and second DRX configurations.

In some example embodiments, the first DRX configuration of the first device 110 may be also used for a third communication between the second and third devices 120 and 130 on the indirect path, for example, in the link 150 as shown in FIG. 1 to avoid transmission conflict at the side of the third device 130.

In some example embodiments, the first device 110 may receive, from the third device 130, a third DRX configuration for the third communication between the second and third devices 120 and 130 on the indirect path. Then, the first device 110 may transmit, to the second device 120, a DRX configuration preference for the first DRX configuration, for example, in a RRC UEAssistanceInformation message. As such, the second device 120 may determine the first DRX configuration by considering the preference of the first device 110.

In some example embodiments, either of the first device 110 or the third device 130 which has received the second DRX configuration may provide the second DRX configuration to one another (for example, the SL peer UE). The receiver may in turn transmit its DRX preference accordingly to the second device such as in RRC UEAssistanceInformation message.

FIG. 5 shows a flowchart of an example method 500 implemented at a second device in accordance with some example embodiments of the present disclosure. For the purpose of discussion, the method 500 will be described from the perspective of the second device 120 in FIG. 1.

At block 510, the second device 120 transmits, to at least one of the first device 110 or the third device 130, a DRX configuration for the direct path between the first and second devices 110 and 120 and the indirect path between the first and second devices 110 and 120 via the third device 130. The DRX configuration comprises at least one of the first DRX configuration or the second DRX configuration. The first DRX configuration is used for the first communication between the first and second devices 110 and 120 on the direct path, and the second DRX configuration is used for the second communication between the first and third devices 110 and 130 on the indirect path.

In some example embodiments, the second device 120 may determine a time division for switching between the direct path and the indirect path. Then, the second device 120 may determine the DRX configuration based on the determined time division.

In some example embodiments, the second device 120 may determine the DRX configuration based on the issue(s) to be addressed. For example, the second device 120 may determine whether to initiate a DRX configuration comprising either the first DRX configuration (such as a Uu DRX configuration) or the second DRX configuration (such as a SL DRX configuration) to the first device 110 in MP to address the first issue, for example, to control MP transmissions for the first device 110 in a time-division fashion between the direct path and the indirect path based on the first or second DRX configuration. Alternatively, or in addition, the second device 120 may provide a DRX configuration comprising both the first and second DRX configurations to the first device 110 to address both the first issue and the second issue (for power saving).

In some example embodiments, this determining may be based on whether a DRX configuration request for power saving from the first device 110 (or the second device 120 or a core network on behalf of the first device 110) is received or not. In some example embodiments, the second device 120 may transmit the DRX configuration comprising either the first or second DRX configuration to the at least one of the first or third device 110 or 130, without a request for at least one of the first or the second DRX configuration from the first device 110.

For example, the DRX configuration for addressing the first issue may be initiated by the second device 120 without a DRX configuration request for power saving from the first device 110, or regardless of whether the first device 110 needs DRX (such as SL DRX or Uu DRX) for power saving or not. In some example embodiments, the second device 120 may determine whether the first or second DRX configuration is used for the DRX configuration based on the amount of data to be transmitted and current traffic loads on the direct and indirect paths.

For example, the constraints and resolutions of the first DRX configuration compared to the second DRX configuration may be considered by the second device 120, which may be related to DRX cycles, ON durations, DRX related timers including inactivity timer, HARQ retransmission timer, HARQ round trip time timer, the support of long and/or DRX cycle, and/or the like. Alternatively, or in addition, the second device 120 may determine the DRX configuration by considering potential use of ON duration extension on the direct path and the indirect path due to expected traffic patterns or uncertainties, SL Channel Busy Ratio (CBR) or Uu channel state information (CSI) reported from the first device 110, and/or the like.

In some example embodiments, one of the first and second DRX configurations may be predefined to address the first issue. In this example, the second device 120 may use the predefined DRX configuration (for example, the SL DRX configuration) for addressing the first issue, thereby avoiding a need of the explicit indication that the DRX configuration is for addressing the first issue. Thus, the overhead over the air may be reduced, and communication efficiency may be improved.

In some example embodiments, if the second device 120 receives a request for at least one of the first or the second DRX configuration from the first device 110, the second device 120 may transmit the DRX configuration comprising both the first and second DRX configurations to the at least one of the first or third device 110 or 130. The request may be received from the first device 110 directly or via the third device 130.

For example, the DRX configuration for addressing both the first issue and the second issue may be on the need for power saving of the first device 110, for example, upon receiving a DRX configuration request for power saving from the first device 110 directly or from the third device 130 or a core network (CN) on behalf of the first device 110. The request may be implicit (for example, via an indication of UE type or capability class) or explicit.

The request from the first device 110 may be based on at least one of a first DRX configuration request (for example, the Uu DRX configuration request) or a second DRX configuration request (for example, the SL DRX configuration request). In this regard, the second DRX configuration request from the first device 110 (to the third device 130 and from the third device 130 to the second device 120) may further trigger a first DRX configuration. Likewise, a first DRX configuration request from the first device 110 to the second device 120 may further trigger a second DRX configuration for the first device 110 via the third device 130, as both the first DRX configuration and the second DRX configuration need to be provided for facilitating DRX for power saving for the first device 110.

In some example embodiments, the second device 120 may transmit, to at least one of the first or third device 110 or 130, an indication whether the at least one of the first or second DRX configuration is used for controlling multipath transmissions of the first device 110 or for both controlling MP transmissions and power-saving of the first device 110. For example, the second device 120 may send the DRX configuration to the first device 110 with an implicit or explicit indication whether the DRX configuration is for addressing the first issue or both the first issue and the second issue. The explicit indication may allow for configuring the DRX configuration for different purposes in different stages or in different options.

In some example embodiments, either the first device 110 or the second device 120 or both may inform the third device 130 about the DRX configuration or at least the timing information by which the third device 130 is communicating with the first device 110 over the link 145 (such as SL) for the indirect path. Thus, the third device 130 may be able to determine the time division between the direct path and the indirect path for the first device 110 and communicate with the first device 110 according to the time division.

For example, in the case that the first DRX configuration is used, either the first device 110 or the second device 120 or both may inform the third device 130 about the DRX configuration or at least the timing information. In the case that the second DRX configuration is used, the second device 120 may first provide the DRX configuration comprising the second DRX configuration to the third device 130, and the third device 130 then may send the second DRX configuration to the first device 110. Thus, the third device 130 may communicate with the first device 110 according to the second DRX configuration.

In one example, the DRX configuration comprising either the first or second DRX configuration, which may be a Uu DRX configuration or a SL DRX configuration, may be provided to the first device using Uu and SL DRX mechanisms. For example, the first DRX configuration may be transmitted from the second device 120 (for example, the gNB) to the first device 110 (for example, the remote UE), and the second DRX configuration may be first from the second device 120 to the third device 130 (for example, the relay UE) and then from the third device 130 to the first device 110.

In another example, the DRX configuration comprising both the first and second DRX configurations, which may be the Uu and SL DRX configurations, may be provided from the second device 120 to the first device 110, either directly or via the third device 130 but transparent to the third device 130.

At block 520, the second device 120 communicates with the first device 110 on the direct path based on the transmitted DRX configuration. In some example embodiments, if the DRX configuration comprises only the first DRX configuration indicating a first ON duration and a first OFF duration in a first DRX cycle for the first communication, then the second device 120 may communicate with the first device 110 for the first ON duration.

The first ON duration is extendable. In some example embodiments, if the first ON duration is extended over at least a part of the first OFF duration, the second device 120 may transmit, to the third device 130, a first notification that the first ON duration is extended over at least the part of the first OFF duration. The notification may implicitly or explicitly indicate an extension time of the ON duration on the direct path. Then, the third device 130 may delay the second communication with the first device 110 over the indirect path for the extension time.

In some example embodiments, if the DRX configuration comprises the second DRX configuration indicating a second ON duration and a second OFF duration in a second DRX cycle for the second communication, the second device 120 may communicate with the first device 110 on the direct path for the second OFF duration.

In some example embodiments, if the second ON duration is extended over at least a part of the second OFF duration, the second device 120 may receive, from the first or third device 110 or 130, a second notification that the second ON duration is extended over at least the part of the second OFF duration. In some example embodiments, the second notification may indicate that the second ON duration is extended by an extension time. Accordingly, the second device 120 may delay the first communication with the first device 110 on the direct path for the extended time.

For example, the second device 120 may receive a notification of an extension of the ON duration on the indirect path from either the first device 110 or the third device 130 in case the DRX configuration comprises only the second DRX configuration for addressing the first issue. The notification may implicitly or explicitly indicate an extension time of the ON duration on the indirect path. The second device 120 may then delay the first communication with the first device 110 over the direct path for the extension time.

In some example embodiments, in the case that the DRX configuration comprises both the first and second DRX configurations, if the first DRX configuration indicates a first ON duration and a first OFF duration in a first DRX cycle for the first communication, and the second DRX configuration indicates a second ON duration and a second OFF duration in a second DRX cycle for the second communication, then the second device 120 may communicate with the first device 110 on the direct path for the first ON duration. The first ON duration may be extended over at least a part of the first OFF duration except the second ON duration or until the start thereof. Alternatively, or in addition, the second ON duration may be extended over at least a part of the second OFF duration except the first ON duration or until the start thereof.

In some embodiments, the first DRX configuration may be further used for a third communication between the second and third devices on the indirect path. For example, to avoid transmission conflict at the third device 130, the second device 120 which is aware of the relation between the first device 110 and the third device 130 may configure the same DRX configuration for the first communication with the first device 110 and the third communication with the third device 130.

In some example embodiments, the direct path and the indirect path of the first device 110 such as the remote UE may be provided by the same serving cell or different serving cells of the second device 120 such as the gNB. For example, by taking the remote UE, the gNB and the relay UE as examples of the first, second and third devices 110, 129 and 130 and Uu transmissions and SL transmissions as examples of the first and second communications, SL transmissions between the remote UE and the relay UE for the indirect path may be controlled by the serving cell of the relay UE, denoted as Cell-A, for example, according to Rel-17 U2N relays. Uu transmissions between the remote UE and the gNB for the direct path may be controlled by the other cell, denoted as Cell-B.

It is noted that Cell-A and Cell-B may be provided by different Distributed Units (DU) under control of the Central Unit (CU) of the gNB. Thus, the DRX configuration to the remote UE may have certain impacts on the DUs for MP transmissions of the remote UE. That is, the DUs may need to be configured with at least respective timing information in order to communicate with the remote UE or the relay UE over Uu according to the DRX configuration of the remote UE.

In one example, SL transmissions between the remote UE and the relay UE may be fully controlled by Cell-A including SL resources. In another example, SL transmissions between the remote UE and the relay UE may be controlled by Cell-A but SL resources may be provided to the remote UE by either Cell-A or Cell-B or both. The remote UE may use mode 1 resources provided by Cell-B, provided that the RRC entity controlling the remote UE in the gNB side is terminated in Cell-B. It is noted that mode 1 refers to the resource allocation mode in which resources used for a SL transmission from a Tx UE are scheduled by a serving gNB, as specified for 3GPP NR SL communications. There is also mode 2 specified for 3GPP NR SL communications in which resources used for a SL transmission from a Tx UE are selected by the Tx UE autonomously from a (pre)configured resource pool.

There may be an internal (intra-gNB) coordination between Cell-A and Cell-B (the RRC entities thereof in the gNB) for determining and sending the DRX configuration to the remote UE as well as operating according to the DRX configuration provided to the remote UE. Even in the case that Cell-A (the RRC entity thereof) is controlling both the direct path and the indirect path, Cell-A may need to provide configuration information such as timing information according to the DRX configuration of the remote UE to Cell-B (the DU thereof) for facilitating the direct path to the remote UE. In the case that Cell-B terminates the RRC connection of the remote UE, the Uu DRX configuration for the remote UE may be determined by Cell-B, whereas the SL DRX configuration for the remote UE may be determined by Cell-A. Thus, Cell-A and Cell-B may need to talk to one another virtually within the gNB to align the Uu DRX configuration and/or the SL DRX configuration for the DRX configuration towards the remote UE.

In one example, coordination between Cell-A and Cell-B may be proactively avoided or minimized by making Cell-A control both the direct path and the indirect path. Thus, the addition of the indirect path which is controlled by Cell-A to the existing direct path of the remote UE which is controlled by Cell-B may also cause an inter-cell handover of the control plane or RRC connection of the remote UE from Cell-B to Cell-A.

All operations and features related to the second device 120 as described above with reference to FIGS. 1 to 4E are likewise applicable to the method 500 and have similar effects. For the purpose of simplification, the details will be omitted.

Figure 6:
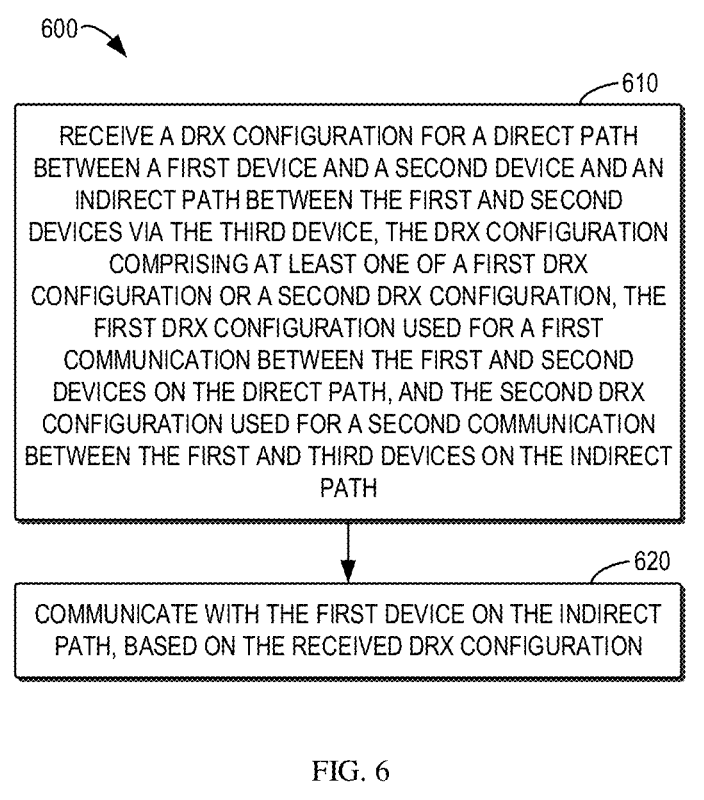

FIG. 6 shows a flowchart of an example method 600 implemented at a third device in accordance with some example embodiments of the present disclosure. For the purpose of discussion, the method 600 will be described from the perspective of the third device 130 in FIG. 1.

At block 610, the third device 130 receives a DRX configuration for the direct path between the first device 110 and the second device 120 and the indirect path between the first and second devices 110 and 120 via the third device 130. The DRX configuration may be received from either or both of the first device 110 and the second device 120. The DRX configuration comprises at least one of a first DRX configuration or a second DRX configuration. The first DRX configuration is used for the first communication between the first and second devices 110 and 120 on the direct path, and the second DRX configuration is used for the second communication between the first and third devices 110 and 120 on the indirect path.

At block 620, the third device 130 communicates with the first device 110 on the indirect path based on the received DRX configuration. For example, based on the DRX configuration, the third device 130 may determine the time division between the direct path and the indirect path for the first device 110 and then communicate with the first device 110 according to the determined time division.

In some example embodiments, the at least one of the first or second DRX configuration may comprise the first DRX configuration indicating a first ON duration and a first OFF duration in a first DRX cycle for the first communication. In this example, the third device 130 may communicate with the first device 110 on the indirect path for the first OFF duration.

In some example embodiments, the first ON duration may be extended over at least a part of the first OFF duration. The third device 130 may receive, from the first or second device 110 or 120, a first notification that the first ON duration is extended over at least the part of the first OFF duration. In some example embodiments, the first notification may indicate that the first ON duration is extended by an extension time. The third device 130 may delay the second communication with the first device 110 on the indirect path for the extended time.

For example, the third device 130 may receive a notification of an extension of the ON duration on the direct path from either the first device 110 or the second device 120 in case the DRX configuration comprises only the first DRX configuration for addressing the first issue. The notification may implicitly or explicitly indicate an extension time of the ON duration on the direct path. The third device 130 may then delay communications with the first device over the indirect path for the extension time.

In some example embodiments, the at least one of the first or second DRX configuration may comprise the second DRX configuration indicating a second ON duration and a second OFF duration in a second DRX cycle for the second communication. The third device 130 may communicate with the first device 110 on the indirect path for the second ON duration.

In some example embodiments, the second ON duration may be extended over at least a part of the second OFF duration. The third device 130 may transmit, to the second device 120, a second notification that the second ON duration is extended over at least the part of the second OFF duration.

In some example embodiments, the at least one of the first or second DRX configuration may comprise both the first and second DRX configurations. The first DRX configuration may indicate a first ON duration and a first OFF duration in a first DRX cycle for the first communication, and the second DRX configuration may indicate a second ON duration and a second OFF duration in a second DRX cycle for the second communication. In some example embodiments, the first ON duration may be extended over at least a part of the first OFF duration except the second ON duration or until the start thereof, and/or the second ON duration may be extended over at least a part of the second OFF duration except the first ON duration or until the start thereof. The third device 130 may communicate with the first device 110 on the indirect path for the second ON duration.

In some example embodiments, the third device 130 may receive, from the first device 110, a request for at least one of the first or the second DRX configuration; and transmitting the request to the second device.

In some example embodiments, the third device 130 may receive, from the first or second device 110 or 120, an indication whether the at least one of the first or second DRX configuration is used for controlling multipath transmissions of the first device or for both controlling multipath transmissions and power-saving of the first device.

In some example embodiments, the first DRX configuration may be further used for a third communication between the second and third devices 120 and 130 on the indirect path.

In some example embodiments, the third device 130 may receive the first DRX configuration from the first device 110. Then, the third device 130 may transmit, to the second device 120, a DRX configuration preference for a third DRX configuration. The third DRX configuration is used for a third communication between the second and third devices on the indirect path.

All operations and features related to the third device 130 as described above with reference to FIGS. 1 to 5 are likewise applicable to the method 600 and have similar effects. For the purpose of simplification, the details will be omitted.

Some example embodiments for the DRX configuration in MP will be discussed below with reference to FIG. 7.

Figure 7:
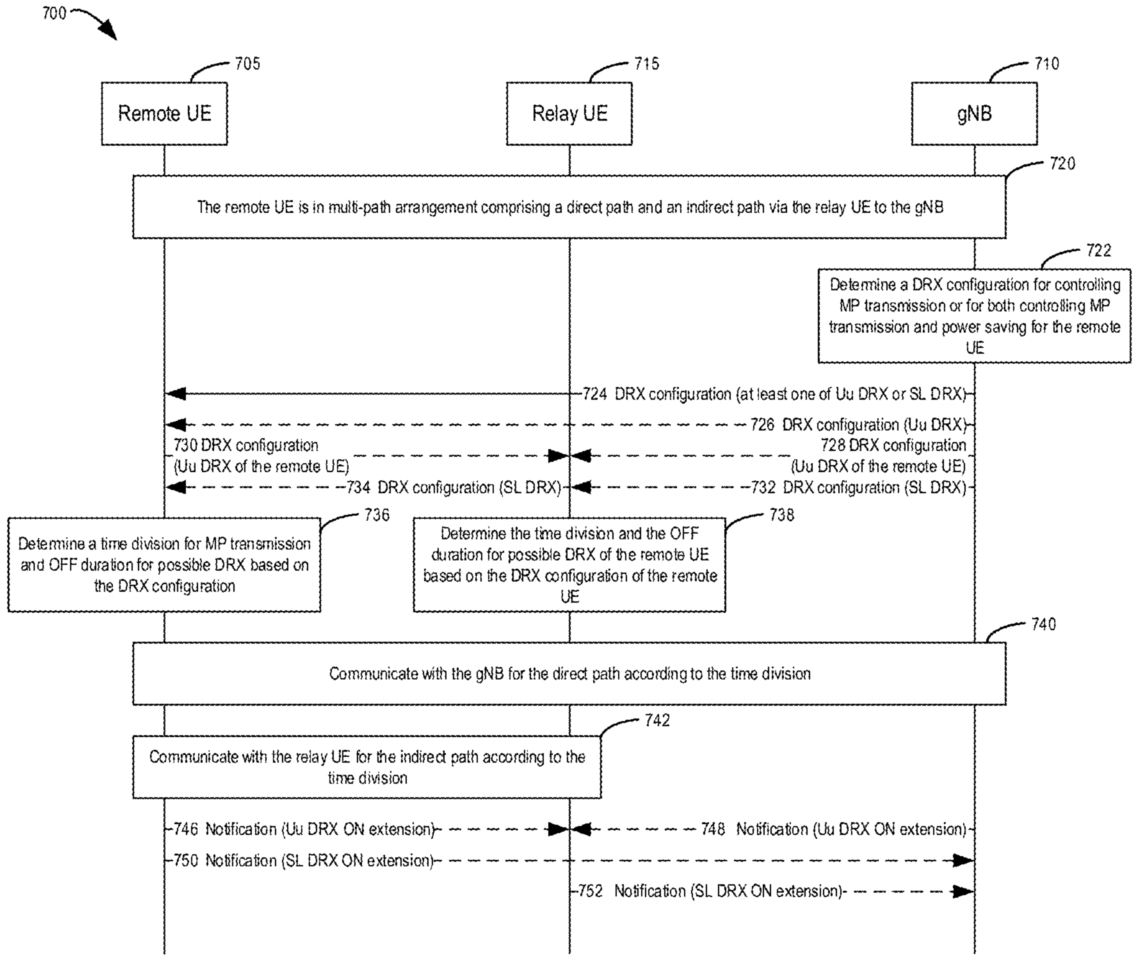
FIG. 7 illustrates a signaling diagram of another example communication process according to some example embodiments of the present disclosure.

FIG. 7 shows a signaling diagram of another example communication process 700 between the first, second and third devices 110, 120 and 130 according to some example embodiments of the present disclosure.

In this example, the first, second and third devices 110, 120 and 130 may operate as a remote UE 705, a gNB 710 and a relay UE 715, respectively. The first and second DRX configurations may be a Uu DRX configuration and a SL DRX configuration, respectively.

As shown in FIG. 7, in the process 700, at 720, the remote UE 705 is in multipath arrangement comprising a direct path and an indirect path via the relay UE 715 to the gNB 710. The gNB 710 may determine (722) a DRX configuration for controlling MP transmission or for both controlling MP transmission and power saving for the remote UE 705. The gNB 710 may transmit (724) DRX configuration (including at least one of Uu DRX or SL DRX configuration) towards the remote UE 705.

In one example, the gNB 710 may transmit (726) the DRX configuration (including Uu DRX configuration) to the remote UE 705 directly. The gNB 710 may also transmit (728) the DRX configuration (including Uu DRX configuration) of the remote UE 705 to the relay UE 715. Alternatively, or in addition, the remote UE 705 may transmit (730) the DRX configuration (including Uu DRX configuration) to the relay UE 715.

Then, the remote UE 705 may determine (736) a time division for MP transmission and OFF duration for possible DRX based on the DRX configuration. The relay UE 715 may determine (738) the time division and the OFF duration for possible DRX of the remote UE 705 based on the DRX configuration of the remote UE 705. Further, the remote UE 705 may communicate (740) with the gNB 710 for the direct path according to the time division. The remote UE 705 may communicate (742) with the relay UE 715 for the indirect path according to the time division.

In one example, the remote UE 705 may transmit (746) a notification (about Uu DRX ON extension) to the relay UE 715. Alternatively, or in addition, the gNB 710 may transmit (748) such a notification (about Uu DRX ON extension) to the relay UE 715. In another example, the remote UE 705 may transmit (750) a notification (about SL DRX ON extension) to the gNB 710. Alternatively, or in addition, the relay UE 715 may transmit (755) this notification (about SL DRX ON extension) to the gNB 710.

In some example embodiments, a first apparatus capable of performing any of the method 300 (for example, the first device 110 in FIG. 1) may comprise means for performing the respective operations of the method 300. The means may be implemented in any suitable form. For example, the means may be implemented in a circuitry or software module. The first apparatus may be implemented as or included in the first device 110 in FIG. 1.

In some example embodiments, the first apparatus comprises means for receiving a discontinuous reception, DRX, configuration for a direct path between the first device and a second device and an indirect path between the first and second devices via a third device, the DRX configuration comprising at least one of a first DRX configuration or a second DRX configuration, the first DRX configuration used for a first communication between the first and second devices on the direct path, and the second DRX configuration used for a second communication between the first and third devices on the indirect path; and means for communicating with the second device on the direct path and with the third device on the indirect path, based on the received DRX configuration.

In some example embodiments, the at least one of the first or second DRX configuration comprises the first DRX configuration indicating a first ON duration and a first OFF duration in a first DRX cycle for the first communication, and means for communicating with the second device on the direct path and with the third device on the indirect path comprises: means for communicating with the second device on the direct path for the first ON duration; or means for communicating with the third device on the indirect path for the first OFF duration.

In some example embodiments, the first ON duration is extended over at least a part of the first OFF duration, and the first device is further caused to perform: means for transmitting, to the third device, a first notification that the first ON duration is extended over at least the part of the first OFF duration.

In some example embodiments, the at least one of the first or second DRX configuration comprises the second DRX configuration indicating a second ON duration and a second OFF duration in a second DRX cycle for the second communication, and means for communicating with the second device on the direct path and with the third device on the indirect path comprises: means for communicating with the third device on the indirect path for the second ON duration; or means for communicating with the second device on the direct path for the second OFF duration.

In some example embodiments, the second ON duration is extended over at least a part of the second OFF duration, and the first device is further caused to perform: means for transmitting, to the second device, a second notification that the second ON duration is extended over at least the part of the second OFF duration.

In some example embodiments, the at least one of the first or second DRX configuration comprises both the first and second DRX configurations, the first DRX configuration indicating a first ON duration and a first OFF duration in a first DRX cycle for the first communication, and the second DRX configuration indicating a second ON duration and a second OFF duration in a second DRX cycle for the second communication, and means for communicating with the second device on the direct path and with the third device on the indirect path comprises: means for communicating with the third device on the indirect path for the first ON duration; and means for communicating with the second device on the direct path for the second ON duration.

In some example embodiments, the first device is in a DRX OFF state for an overlapping OFF duration of the first and second OFF durations.

In some example embodiments, means for receiving the at least one of the first or second DRX configuration comprises: means for in response to transmitting, to the second device, a request for at least one of the first or the second DRX configuration, receiving both the first and second DRX configurations.

In some example embodiments, the request for the at least one of the first or the second DRX configuration is transmitted to the second device directly or via the third device.

In some example embodiments, the first ON duration is extended over at least a part of the first OFF duration except the second ON duration or until the start thereof, and/or the second ON duration is extended over at least a part of the second OFF duration except the first ON duration or until the start thereof.

In some example embodiments, the DRX configuration is received from the second device directly, and the first device is further caused to perform: means for indicating, to the third device, the received DRX configuration.

In some example embodiments, the first apparatus further comprises: means for receiving, from the second or third device, an indication whether the at least one of the first or second DRX configuration is used for controlling multipath transmissions of the first device or for both controlling multipath transmissions and power-saving of the first device.

In some example embodiments, means for communicating with the second device on the direct path and with the third device on the indirect path comprises: means for determining, based on the received DRX configuration, a time division for switching between the direct path and the indirect path; and means for communicating with the second device on the direct path and with the third device on the indirect path, based on the determined time division.

In some example embodiments, the first DRX configuration is further used for a third communication between the second and third devices on the indirect path.

In some example embodiments, the first apparatus further comprises: means for receiving, from the third device, a third DRX configuration for a third communication between the second and third devices on the indirect path; and means for transmitting, to the second device, a DRX configuration preference for the first DRX configuration.

In some example embodiments, the first apparatus further comprises means for performing other operations in some example embodiments of the method 300 or the first device 110. In some example embodiments, the means comprises at least one processor; and at least one memory storing instructions that, when executed by the at least one processor, cause the performance of the first apparatus.

In some example embodiments, a second apparatus capable of performing any of the method 500 (for example, the second device 120 in FIG. 1) may comprise means for performing the respective operations of the method 500. The means may be implemented in any suitable form. For example, the means may be implemented in a circuitry or software module. The second apparatus may be implemented as or included in the second device 120 in FIG. 1.

In some example embodiments, the second apparatus comprises means for transmitting, to at least one of a first device or a third device, a discontinuous reception, DRX, configuration for a direct path between the first and second devices and an indirect path between the first and second devices via the third device, the DRX configuration comprising at least one of a first DRX configuration or a second DRX configuration, the first DRX configuration used for a first communication between the first and second devices on the direct path, and the second DRX configuration used for a second communication between the first and third devices on the indirect path; and means for communicating with the first device on the direct path based on the transmitted DRX configuration.

In some example embodiments, means for transmitting the DRX configuration comprises: means for transmitting the DRX configuration comprising either the first or second DRX configuration to the at least one of the first or third device, without a request for at least one of the first or the second DRX configuration from the first device.

In some example embodiments, the DRX configuration comprises the first DRX configuration indicating a first ON duration and a first OFF duration in a first DRX cycle for the first communication, and means for communicating with the first device on the direct path comprises: means for communicating with the first device on the direct path for the first ON duration.

In some example embodiments, the first ON duration is extended over at least a part of the first OFF duration, and the second device is further caused to perform: means for transmitting, to the third device, a first notification that the first ON duration is extended over at least the part of the first OFF duration.

In some example embodiments, the DRX configuration comprises the second DRX configuration indicating a second ON duration and a second OFF duration in a second DRX cycle for the second communication, and means for communicating with the first device on the direct path comprises: means for communicating with the first device on the direct path for the second OFF duration.

In some example embodiments, the second ON duration is extended over at least a part of the second OFF duration, and the second device is further caused to perform: means for receiving, from the first or third device, a second notification that the second ON duration is extended over at least the part of the second OFF duration.

In some example embodiments, the second notification indicates that the second ON duration is extended by an extension time, and the second device is further caused to perform: means for delaying communication with the first device on the direct path for the extended time.

In some example embodiments, means for transmitting the DRX configuration comprises: means for in response to receiving a request for at least one of the first or the second DRX configuration from the first device, transmitting the DRX configuration comprising both the first and second DRX configurations to the at least one of the first or third device.

In some example embodiments, the request for the at least one of the first or the second DRX configuration is received from the first device directly or via the third device.

In some example embodiments, the first DRX configuration indicates a first ON duration and a first OFF duration in a first DRX cycle for the first communication, and the second DRX configuration indicates a second ON duration and a second OFF duration in a second DRX cycle for the second communication, and means for communicating with the first device on the direct path comprises: means for communicating with the first device on the direct path for the first ON duration.

In some example embodiments, the first ON duration is extended over at least a part of the first OFF duration except the second ON duration or until the start thereof, and/or the second ON duration is extended over at least a part of the second OFF duration except the first ON duration or until the start thereof.

In some example embodiments, the second apparatus further comprises: means for transmitting, to at least one of the first or third device, an indication whether the at least one of the first or second DRX configuration is used for controlling multipath transmissions of the first device or for both controlling multipath transmissions and power-saving of the first device.

In some example embodiments, the second apparatus further comprises: means for determining a time division for switching between the direct path and the indirect path; and means for determining the DRX configuration based on the determined a time division.

In some example embodiments, the first DRX configuration is further used for a third communication between the second and third devices on the indirect path.

In some example embodiments, the second apparatus further comprises means for performing other operations in some example embodiments of the method 500 or the second device 120. In some example embodiments, the means comprises at least one processor; and at least one memory storing instructions that, when executed by the at least one processor, cause the performance of the second apparatus.

In some example embodiments, a third apparatus capable of performing any of the method 600 (for example, the third device 130 in FIG. 1) may comprise means for performing the respective operations of the method 600. The means may be implemented in any suitable form. For example, the means may be implemented in a circuitry or software module. The third apparatus may be implemented as or included in the third device 130 in FIG. 1.

In some example embodiments, the third apparatus comprises means for receiving a discontinuous reception, DRX, configuration for a direct path between a first device and a second device and an indirect path between the first and second devices via the third device, the DRX configuration comprising at least one of a first DRX configuration or a second DRX configuration, the first DRX configuration used for a first communication between the first and second devices on the direct path, and the second DRX configuration used for a second communication between the first and third devices on the indirect path; and means for communicating with the first device on the indirect path based on the received DRX configuration.

In some example embodiments, the at least one of the first or second DRX configuration comprises the first DRX configuration indicating a first ON duration and a first OFF duration in a first DRX cycle for the first communication, and means for communicating with the first device on the indirect path comprises: means for communicating with the first device on the indirect path for the first OFF duration.

In some example embodiments, the first ON duration is extended over at least a part of the first OFF duration, and the third device is further caused to perform: means for receiving, from the first or second device, a first notification that the first ON duration is extended over at least the part of the first OFF duration.

In some example embodiments, the first notification indicates that the first ON duration is extended by an extension time, and the third device is further caused to perform: means for delaying communication with the first device on the indirect path for the extended time.

In some example embodiments, the at least one of the first or second DRX configuration comprises the second DRX configuration indicating a second ON duration and a second OFF duration in a second DRX cycle for the second communication, and means for communicating with the first device on the indirect path comprises: means for communicating with the first device on the indirect path for the second ON duration.

In some example embodiments, the second ON duration is extended over at least a part of the second OFF duration, and the third device is further caused to perform: means for transmitting, to the second device, a second notification that the second ON duration is extended over at least the part of the second OFF duration.

In some example embodiments, the at least one of the first or second DRX configuration comprises both the first and second DRX configurations, the first DRX configuration indicating a first ON duration and a first OFF duration in a first DRX cycle for the first communication, and the second DRX configuration indicating a second ON duration and a second OFF duration in a second DRX cycle for the second communication, and means for communicating with the first device on the indirect path comprises: means for communicating with the first device on the indirect path for the second ON duration.

In some example embodiments, the third apparatus further comprises: means for receiving, from the first device, a request for at least one of the first or the second DRX configuration; and means for transmitting the request to the second device.

In some example embodiments, the first ON duration is extended over at least a part of the first OFF duration except the second ON duration or until the start thereof, and/or the second ON duration is extended over at least a part of the second OFF duration except the first ON duration or until the start thereof.

In some example embodiments, the third apparatus further comprises: means for receiving, from the first or second device, an indication whether the at least one of the first or second DRX configuration is used for controlling multipath transmissions of the first device or for both controlling multipath transmissions and power-saving of the first device.

In some example embodiments, means for communicating with the first device on the in direct path comprises: means for determining, based on the received DRX configuration, a time division for switching between the direct path and the indirect path; and means for communicating with the first device on the in direct path, based on the determined time division.

In some example embodiments, the first DRX configuration is further used for a third communication between the second and third devices on the indirect path.

In some example embodiments, means for receiving the at least one of the first or second DRX configuration comprises: means for receiving the first DRX configuration from the first device; and the third device is further caused to perform: means for transmitting, to the second device, a DRX configuration preference for a third DRX configuration, the third DRX configuration used for a third communication between the second and third devices on the indirect path.

In some example embodiments, the third apparatus further comprises means for performing other operations in some example embodiments of the method 600 or the third device 130. In some example embodiments, the means comprises at least one processor; and at least one memory storing instructions that, when executed by the at least one processor, cause the performance of the third apparatus.

Figure 8:
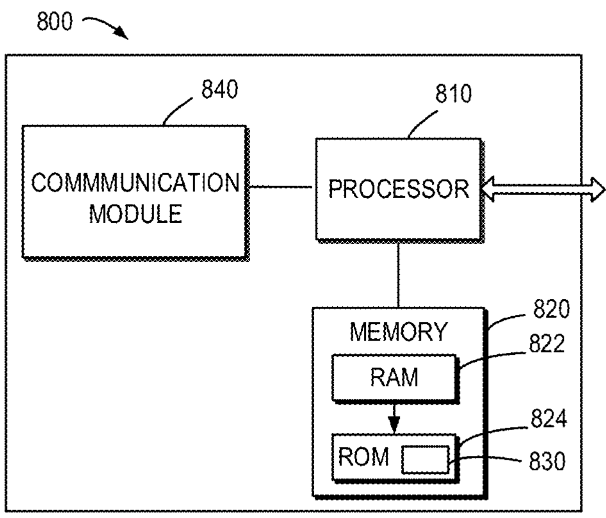
FIG. 8 illustrates a simplified block diagram of a device that is suitable for implementing example embodiments of the present disclosure.

FIG. 8 is a simplified block diagram of a device 800 that is suitable for implementing example embodiments of the present disclosure. The device 800 may be provided to implement a communication device, for example, the first device 110 or the second device 120 as shown in FIG. 1. As shown, the device 800 includes one or more processors 810, one or more memories 820 coupled to the processor 810, and one or more communication modules 840 coupled to the processor 810.

The communication module 840 is for bidirectional communications. The communication module 840 has one or more communication interfaces to facilitate communication with one or more other modules or devices. The communication interfaces may represent any interface that is necessary for communication with other network elements. In some example embodiments, the communication module 840 may include at least one antenna.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The instructions of the program 830 may include instructions for performing operations/acts of some example embodiments of the present disclosure. The program 830 may be stored in the memory, e.g., the ROM 824. The processor 810 may perform any suitable actions and processing by loading the program 830 into the RAM 822.

The example embodiments of the present disclosure may be implemented by means of the program 830 so that the device 800 may perform any process of the disclosure as discussed with reference to FIG. 1 to FIG. 7. The example embodiments of the present disclosure may also be implemented by hardware or by a combination of software and hardware.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 9:
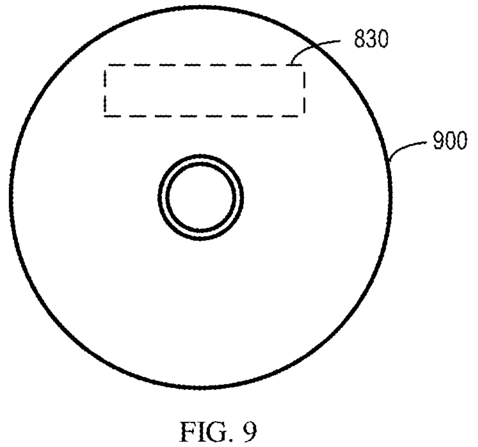
FIG. 9 illustrates a block diagram of an example computer readable medium in accordance with some example embodiments of the present disclosure.

FIG. 9 shows an example of the computer readable medium 900 which may be in form of CD, DVD or other optical storage disk. The computer readable medium 900 has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:

at least one processor; and at least one memory storing instructions that, when executed by the at least one processor, cause the first device at least to perform:

receiving a discontinuous reception (DRX) configuration for a direct path between the first device and a second device and an indirect path between the first and second devices via a third device, the DRX configuration comprising at least one of a first DRX configuration or a second DRX configuration, the first DRX configuration used for a first communication between the first and second devices on the direct path, and the second DRX configuration used for a second communication between the first and third devices on the indirect path;

communicating with the second device on the direct path and with the third device on the indirect path, based on the received DRX configuration;

determining, based on the received DRX configuration, a time division for switching between the direct path and the indirect path; and communicating with the second device on the direct path and with the third device on the indirect path, based on the determined time division.

2. The first device of claim 1, wherein:

the at least one of the first or second DRX configuration comprises the first DRX configuration indicating a first ON duration and a first OFF duration in a first DRX cycle for the first communication, and communicating with the second device on the direct path and with the third device on the indirect path comprises:

communicating with the second device on the direct path for the first ON duration; or communicating with the third device on the indirect path for the first OFF duration.

3. The first device of claim 2, wherein:

the first ON duration is extended over at least a part of the first OFF duration, and the first device is further caused to perform:

transmitting, to the third device, a first notification that the first ON duration is extended over at least the part of the first OFF duration.

4. The first device of claim 1, wherein;

the at least one of the first or second DRX configuration comprises the second DRX configuration indicating a second ON duration and a second OFF duration in a second DRX cycle for the second communication, and communicating with the second device on the direct path and with the third device on the indirect path comprises:

communicating with the third device on the indirect path for the second ON duration; or communicating with the second device on the direct path for the second OFF duration.

5. The first device of claim 4, wherein:

the second ON duration is extended over at least a part of the second OFF duration, and the first device is further caused to perform:

transmitting, to the second device, a second notification that the second ON duration is extended over at least the part of the second OFF duration.

6. The first device of claim 1, wherein:

the at least one of the first or second DRX configuration comprises both the first and second DRX configurations, the first DRX configuration indicating a first ON duration and a first OFF duration in a first DRX cycle for the first communication, and the second DRX configuration indicating a second ON duration and a second OFF duration in a second DRX cycle for the second communication, and communicating with the second device on the direct path and with the third device on the indirect path comprises:

communicating with the third device on the indirect path for the first ON duration; and communicating with the second device on the direct path for the second ON duration.

7. The first device of claim 6, wherein the first device is in a DRX OFF state for an overlapping OFF duration of the first and second OFF durations.

8. The first device of claim 6, wherein receiving the at least one of the first or second DRX configuration comprises:

in response to transmitting, to the second device, a request for at least one of the first or the second DRX configuration, receiving both the first and second DRX configurations.

9. The first device of claim 8, wherein the request for the at least one of the first or the second DRX configuration is transmitted to the second device directly or via the third device.

10. The first device of claim 1, wherein:

the DRX configuration is received from the second device directly, and the first device is further caused to perform:

indicating, to the third device, the received DRX configuration.

11. The first device of claim 1, wherein the first device is further caused to perform:

receiving, from the second or third device, an indication whether the at least one of the first or second DRX configuration is used for controlling multipath transmissions of the first device or for both controlling multipath transmissions and power-saving of the first device.

12. The first device of claim 1, wherein the first DRX configuration is further used for a third communication between the second and third devices on the indirect path.

13. The first device of claim 1, wherein the first device is further caused to perform:

receiving, from the third device, a third DRX configuration for a third communication between the second and third devices on the indirect path; and transmitting, to the second device, a DRX configuration preference for the first DRX configuration.

* * * * *